(12) United States Patent
Meagher

(10) Patent No.: US 9,160,782 B1
(45) Date of Patent: Oct. 13, 2015

(54) SYSTEM AND METHOD OF REMOTELY ACCESSING AND PUBLISHING ONLINE MEMORIAL CONTENT

(71) Applicant: Todd Meagher, Keller, TX (US)

(72) Inventor: Todd Meagher, Keller, TX (US)

( * ) Notice: Subject to any disclaimer, the term of this patent is extended or adjusted under 35 U.S.C. 154(b) by 0 days.

(21) Appl. No.: 14/676,878

(22) Filed: Apr. 2, 2015

(51) Int. Cl.
*G06F 15/16* (2006.01)
*H04L 29/08* (2006.01)
*G06F 17/30* (2006.01)
*G06K 17/00* (2006.01)
*E04H 13/00* (2006.01)
*G06Q 10/10* (2012.01)

(52) U.S. Cl.
CPC ............ *H04L 67/02* (2013.01); *G06F 17/3087* (2013.01); *H04L 67/18* (2013.01); *E04H 13/00* (2013.01); *G06K 17/0022* (2013.01); *G06Q 10/10* (2013.01)

(58) Field of Classification Search
CPC ... G06F 17/3087; H04L 63/102; H04L 67/22; G06Q 10/06; G06Q 10/10; E04H 13/00
USPC ................... 709/217, 219; 707/10, 204, 769; 348/143; 235/380
See application file for complete search history.

(56) References Cited

U.S. PATENT DOCUMENTS

| | | | | |
|---|---|---|---|---|
| 7,395,960 | B1 * | 7/2008 | Toothman et al. | 235/382 |
| 2002/0026455 | A1 * | 2/2002 | Toothman et al. | 707/204 |
| 2003/0197721 | A1 * | 10/2003 | Mindrum et al. | 345/716 |
| 2007/0260610 | A1 * | 11/2007 | Mindrum | 707/10 |
| 2010/0307037 | A1 * | 12/2010 | Chi | 40/124.5 |
| 2011/0161254 | A1 * | 6/2011 | Van Den Bogart | 705/500 |
| 2013/0151554 | A1 * | 6/2013 | Neal et al. | 707/769 |
| 2013/0332563 | A1 * | 12/2013 | Yuen | 709/217 |
| 2014/0218519 | A1 * | 8/2014 | Borovinov | 348/143 |
| 2015/0101026 | A1 * | 4/2015 | Kraus | 726/4 |

* cited by examiner

*Primary Examiner* — Dustin Nguyen

(57) ABSTRACT

A system is provided comprising processor, memory and a memorial application stored in the memory that, when executed on the processor, receives a message from a mobile device, the message requesting information about physical memorials proximate the device. The system also matches a physical location of the device with at least a first proximate physical memorial described in a database. The system also transmits to the device a list including the at least first proximate physical memorial and other physical memorials within a predetermined distance of the present physical location, wherein information about the at least first proximate physical memorial and the other physical memorials is publicly available. The system also receives a second message from the device containing a selection of the first physical memorial from the list. The system also sends to the device electronic media commemorating at least one deceased person associated with the first physical memorial.

13 Claims, 3 Drawing Sheets

SYSTEM AND METHOD OF REMOTELY ACCESSING AND PUBLISHING ONLINE MEMORIAL CONTENT

CROSS REFERENCE TO RELATED APPLICATIONS

None

FIELD OF THE DISCLOSURE

The present disclosure relates generally to linking physical locations of memorials with stored electronic records of the memorials. More particularly, the present disclosure provides systems and methods promoting persons visiting cemeteries, memorial parks and monuments to receive certain commemorative electronic content based on the persons' geographic locations and further enabling such persons to create and view online memorials featuring commemorative material.

BACKGROUND OF THE DISCLOSURE

Persons visiting memorial parks including cemeteries, memorial parks and monument sites may desire information about deceased persons interred or otherwise commemorated at the sites. When visiting gravesites of deceased persons that the visitor knew, such as those of family members, the visit may be enhanced by recollecting experiences the visitor shared with the deceased or by learning more about the deceased's life. Visitors placing flowers and other gifts at such sites may also wish that the commemorative experience could be shared with others not present. Younger family members who barely knew or did not know the deceased may find that additional information about the deceased enriches their visit and broadens their overall appreciation of their parents and extended families.

During visits to cemeteries and memorials, visitors may also encounter burial stones and monuments exhibiting names that arouse curiosity. The inscribed names may be slightly familiar or reminiscent of long ago acquaintances, neighbors, or fellow townspeople and community members. The names may be unusual or interesting for other reasons, for example a shared ethnicity or possible relation. The deceased may have died at a young age or may have been a casualty of war or tragedy. The visitor may at that moment or in the future desire information about the persons interred or memorialized at the plot or memorial. Such information may support recollection of certain memories and enhance the visitor's overall experience.

SUMMARY OF THE DISCLOSURE

The present disclosure provides systems and methods for a visitor to a memorial park to receive information from stored records and online memorials about a deceased person buried at a proximate gravesite or otherwise commemorated by a proximate monument. Alternatively, when deceased persons of interest are not commemorated with stored records and online memorials, such records and online memorials may be created as provided herein. When in possession of a mobile device, for example a mobile phone, the visitor activates a client portion of an application that transmits a request for information to a remote computer. Based on global positioning system (GPS) location coordinates determined for the mobile device, the computer consults a database for gravesites or memorials at or near the visitor's location.

The computer generates a list of such nearby gravesites or memorials. If information about the nearby gravesites or memorials is publicly available and not designated as private, the computer sends a listing of the sites to the visitor's device. The visitor reviews the list and makes a selection of a nearby site of interest which may be the burial site of a loved one that the visitor is presently standing near. Using the mobile device, the visitor sends the selection to the remote computer. In response the computer transmits back to the mobile device stored information including photographs, video and audio content, and text material and tributes featuring the deceased person interred at the gravesite.

Viewing, listening to, and reading the received information while at the site may allow the visitor to have an enhanced and enriched experience. The visitor may recall and relive happy and rich memories. This visitor may receive information about the deceased that is new and enlightening. Insights gained about the deceased's life may expand the visitor's affection for and appreciation of the life lived and contributions made by the deceased.

A visitor to a memorial park may also wish to view information about interred or commemorated persons that the visitor did not personally know or know of or of whom the visitor previously had no knowledge or perhaps had ever even heard of. Visitors to cemeteries and monuments may encounter gravestones or memorials of deceased persons whose inscribed names or other displayed information arouse curiosity for many reasons. As long as stored information about the deceased persons is not designated as private, a visitor in possession of a mobile device that subscribes to a program using the systems and methods provided herein may request and receive any information to which the system has access.

In addition to storing and providing information to subscribing parties about deceased persons interred and memorialized at some gravesites, the present disclosure also provides for digital or online memorials to be created and accept continuing contributions of electronic media. Family members, friends and other authorized parties may then contribute photographs and other content such that the online memorial is continually viewable and may be continually updated.

A visitor to a cemetery that is carrying a mobile device and using the systems and methods of the present disclosure may request information about a particular gravesite or memorial at or near the present location of the visitor. The visitor may receive a reply that no stored record exists for the site or memorial. The visitor may then request that a record and an online memorial be established for the site or memorial. The visitor may at the same time submit a photograph of the gravestone or memorial. The system will create such record and online memorial and associate it with the present location of the visitor as established by the present global positioning system (GPS) coordinates of the mobile device. The system will also add the submitted photograph to the newly created online memorial. The visitor is then designated "caregiver" of the new online memorial for the site and controls access to it. The visitor may take these steps and have an online memorial created for interred and memorialized persons entirely unknown to the visitor.

A visitor to a cemetery placing flowers at a gravesite of a loved one may wish to share the experience with others not present at the time. In an example, a mobile device user visiting a memorial park may capture a photograph, for example, of a gravestone with fresh flowers placed at its base for posting on an existing or newly created online memorial. The device user may submit the photograph to the online memorial that is created or updated with the new photograph. Other family members not present at the memorial park or unable to visit the memorial park because, for example, they reside too great a distance or have children who are uncomfortable visiting the memorial park. Such persons unable or unwilling to visit the memorial park may be able to remotely view the image including the freshly placed flowers and may find enjoyment and solace from distant locations, for example on an electronic device in their homes. The online memorial may also promote the creation of personalized tributes associated with special dates or events, such as the birthday or anniversary of the passing of the deceased. Personalized tributes may be added to online memorials and viewed at later times, for example at subsequent anniversaries of the loved one's passing.

DETAILED DESCRIPTION OF THE INVENTION

Figure 1:
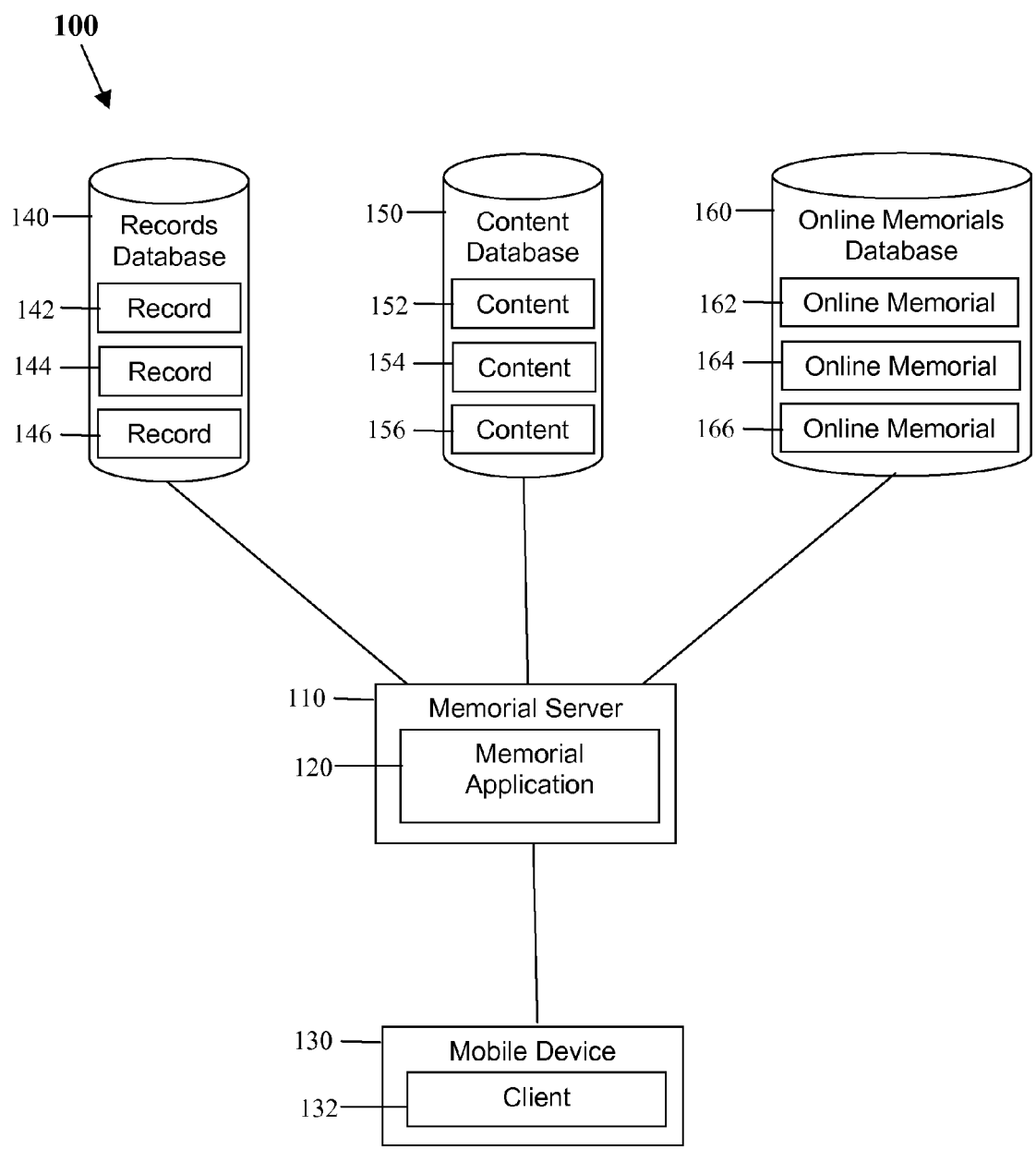
FIG. 1 is a block diagram of a system for remotely accessing and publishing online memorial content according to an embodiment of the present disclosure.

Turning now to FIG. 1, a system 100 remotely accessing and publishing online memorial content is provided. The system 100 comprises a memorial server 110, a memorial application 120, a mobile device 130, a records database 140, a content database 150, an online memorials database 160, and online memorials 162, 164, 166 stored in the online memorials database 160.

The memorial server 110 is a computer system. Computer systems are described in detail hereinafter. Functionality provided by the memorial server 110 may execute on more than one physical computer that may be located at more than one geographic site. Functionality of the memorial server 110 may be cloud-based such that processing is distributed across geographically distributed hardware and software networks.

The memorial application 120 executes on the memorial server 110 and exchanges messages with the mobile device 130. The mobile device 130, which may be a mobile telephone, is in possession of a subscriber that may visit a cemetery, for example. The memorial application 120 is a program subscribed to by the subscriber that provides information about deceased persons interred at gravesites and commemorated at memorials and monuments that the subscriber carrying the mobile device 130 may visit. The memorial application 120 also allows creation of online memorials 162, 164, 166 commemorating deceased persons.

A great deal of information is publicly available about persons who are deceased. The memorial application 120 gathers information about deceased persons who are interred at cemeteries or otherwise commemorated at parks and monument sites that subscribers in possession of devices such as the mobile device 130 may visit. The memorial application 120 may purchase or otherwise gain access to photographs, audio and video content, and text material about deceased persons. The memorial application 120 may make such material available to its subscribers when they visit the gravesites and memorials of the deceased persons or when viewing online memorials 162, 164, 166 remotely.

The memorial application 120 may in some instances have access to material that families of the particular deceased persons wish to have classified as private or not for distribution to any subscriber that requests the material. In such cases the material would only be released to subscribing family members or other parties the subscribing family members designate as authorized recipients. Since much of the material accumulated and stored by the memorial application 120 is acquired from public sources, the memorial application 120 may classify material stored and distributed under its program as public unless the memorial application 120 determines or is advised otherwise.

When a subscriber in possession of the mobile device 130 visits a cemetery, the subscriber may be standing near a burial site of a loved one and desire information about the interred person. The subscriber activates a client 132 executing on the mobile device 130. The client 132 is locally executing client software of the memorial application 120 and may be a small downloadable "app" that remains resident on the mobile device 130. By activating the client 132, a wireless message is sent to the memorial application 120 executing on the memorial server 110 which is likely distant from the subscriber at the cemetery. In an alternative embodiment, instead of executing the client 132, the subscriber may instead access an Internet web link which would cause an Internet web site associated with the memorial application 120 to be accessed.

When the memorial application 120 receives the wireless message from the mobile device 130, the memorial application 120 recognizes the mobile device 130 as associated with a subscriber account. The memorial application 120 may read the International Mobile Equipment Identifier (IMEI) or other identifier of the mobile device 130 embedded in the message. Such other identifier may be provided by the client 132. The memorial application 120 optionally may require some type of authentication. The memorial application 120 determines the precise physical location of the mobile device 130 by accessing global positioning system (GPS) coordinates of the mobile device 130. Accessing such GPS information may be done in several well-known manners.

Once the precise physical location of the mobile device 130 has been determined using GPS coordinates, the memorial application 120 accesses the records database 140. The records database 140 stores gravesite GPS locations and the corresponding names of deceased persons resting at each of the GPS locations. The records database 140 may store records 142, 144, 146 containing pairs of deceased names and their GPS locations for many thousands of gravesites and mausoleums at a large number of cemeteries and memorial parks as well as monuments where deceased persons are not buried but are commemorated at monument sites. Online memorials 162, 164, 166 may already have been created corresponding to many of the records 142, 144, 146.

The memorial application 120 searches for a record 142 in the records database 140 with the GPS location that matches or nearly matches the present GPS location of the mobile device 130. The record 142 found may be that of the deceased person whose gravesite the subscriber is presently standing at.

The memorial application 120 may gather records 142, 144, 146 for a plurality of gravesites within a predetermined distance of the subscriber's present GPS location. Such predetermined distance may be 25 feet, 50 feet, or some other distance.

The memorial application 120 creates a list that contains the records 142, 144, 146 within the predetermined distance of the subscriber's present GPS location. The memorial application 120 sends the list to the mobile device 130. The mobile device 130 receives the list. The subscriber using the mobile device 130 reviews the list and chooses the name of the deceased whose gravesite the subscriber is standing at or near. As long as the record 142 for the particular gravesite chosen by the subscriber is not marked as private, the memorial application 120 will proceed with forwarding desired electronic material to the mobile device 130. Such electronic material may be stored in an online memorial 162 for the deceased. If the record 142 and associated online memorial 162 are marked as private, the subscriber is provided access so long as the memorial application 120 recognizes the mobile device 130 as authorized or the subscriber enters some type of credential that meets a predetermined requirement.

If not authorized and not in possession of the necessary credentials, the subscriber may activate a command made available by the client 132 executing on the mobile device 130. The command causes a message to be sent to person(s), referred to herein as "caregivers" who control access to the online memorial 162. In an embodiment, caregivers are next of kin of the deceased person resting at the site of interest. The subscriber in the message would request access to at least some portions of the online memorial 162. The caregiver may after corresponding with the subscriber decide to grant or not grant the subscriber access to private content in the online memorial 162.

The content database 150 stores items of content 152, 154, 156 that may also be contained within online memorials 162, 164, 166 including photographs, audio and video content, text and other material about persons interred and commemorated at locations covered by online memorial programs managed by the memorial application 120. The memorial application 120 sends some or all of content 152 associated with the record 142 and online memorial 162 for the gravesite of interest to the mobile device 130 in possession of the subscriber. In an embodiment, the subscriber may have the option of choosing photographs only or entering some other specific request instead of receiving all content 152, 154, 156 and the online memorial 162 about a particular deceased person.

In a second embodiment, the present disclosure provides for subscribers in possession of the mobile device 130 to create online memorials 162, 164, 166 whether physically at a gravesite or memorial or not. When situated near a gravesite or monument for which the memorial application 120 does not have a record 142 matching the current GPS location of the mobile device 130, a subscriber may request creation of a new online memorial 162 for the particular site.

In the previous embodiment, the memorial application 120 located records 142, 144, 146 precisely at or within a predetermined distance of the GPS location of the mobile device 130. The memorial application 120 then forwarded content 152 associated with the specific record 142 and online memorial 162 for the subscriber's viewing and enjoyment. In the second embodiment discussed below, the memorial application 120 is unable to locate any records 142, 144, 146 proximate the mobile device 130. The memorial application 120 may alternatively find records 142, 144, 146 of nearby gravesites, but no record 142 specifically corresponding to the gravesite in which the subscriber is interested and may be standing next to at the time.

The subscriber may request a new record 142 and online memorial 162 be created for the previously undocumented gravesite at the subscriber's current GPS location. The subscriber may capture a photograph of the gravestone or memorial using the mobile device 130 and send it to the memorial application 120 for inclusion in the new online memorial 162 along with the current GPS location.

By default, the subscriber that initiated creation of the online memorial 162 for a previously undocumented grave or memorial site is designated the caregiver of the new online memorial 162. This is the case even if the subscriber has no knowledge of the deceased person or his/her family. The caregiver has authority to add and remove electronic media to and from the new online memorial 162. The caregiver may also authorize other persons to be caregivers. Such added persons may then add content 152, 154, 156 of their choosing.

When additional caregivers are appointed by the original caregiver, the original caregiver is designated the primary caregiver and retains authority to delete posted content as well as revoke caregiving privileges from additional caregivers that the primary caregiver had appointed. The primary caregiver may also configure the online memorial 162 to send out notifications to additional caregivers. The primary caregiver may request that the additional caregivers place flowers at the site on the deceased's birthday or anniversary of passing or take other actions such as attend to clearing accumulated brush away from the site.

The present disclosure also permits a subscriber to create online memorials 162, 164, 166 when not physically at a gravesite or memorial park and when not using the mobile device 130. The memorial application 120 may be accessed from an Internet browser executing on a desktop or laptop computer. The memorial application 120 in its initial startup screens provides for creation of a new online memorial by using "streetview" functionality incorporated into the memorial application 120. Such functionality substitutes for the fact that GPS location information of the mobile device 130 is not relevant as the subscriber is not near the gravesite of interest at the time. Such streetview functionality allows for displayed positions within maps to be "zoomed in" on and pinpointed exactly. Such pinpointed spots within cemeteries may not be associable with identifiable street addresses and may instead be points not bearing addresses such as memorials within cemeteries.

When creating a new online memorial 162 when not proximate the site of interest, the subscriber enters his/her information as caregiver and enters the name, date of passing and other information about the deceased. The subscriber then enters the name and/or street address of the cemetery. The streetview application provided by the memorial application 120 locates the cemetery and provides a map within which the cemetery is shown. The subscriber can then zoom in on the cemetery until physical memorials are visible. The subscriber is then able to use the computer's pointing device to "drag" a pin provided by the streetview application over to the physical memorial of interest. By positioning the pin exactly on the physical memorial of interest, the memorial application 120 can determine the exact geographical location of the physical memorial. The memorial application 120 associates the exact location with the name of the deceased in the new record 142 and new online memorial 162. The subscriber, as caregiver, can then add content 152 to the new online line memorial 162 and designate other persons, for example family members, as additional caregivers. Persons visiting the cemetery in the future who are subscribers in possession of the mobile device 130 with client 132 installed can then access the online memorial 162 and view any content 152 within the online memorial 162 that is not marked private.

The present disclosure also allows for more than one online memorial 162 to be created for a single physical memorial. In the case of deceased celebrities, creative persons, political figures, activists, and other public figures, for example, devoted fans and followers may create their own personalized online memorials 162, 164, 166 for the same gravesite or memorial. Such fans may provide their own personalized tributes and other content 152, 154, 156, such as photographs taken at concerts given by the deceased and other memorabilia created by the fans. As creator of his/her own online memorial 162 for the deceased celebrity, a particular fan is the caregiver for his/her own online memorial 162, even if many online memorials 162, 164, 166 are created for the particular celebrity and memorial site. The fan as caregiver may designate other fans as additional caregivers so they may contribute their own personalized content 152, 154, 156. The caregiver may have commercial motives and may arrange to receive commissions or other compensation when florists or others are contacted through the online memorial 162 to purchase flowers, for instance.

Figure 2:
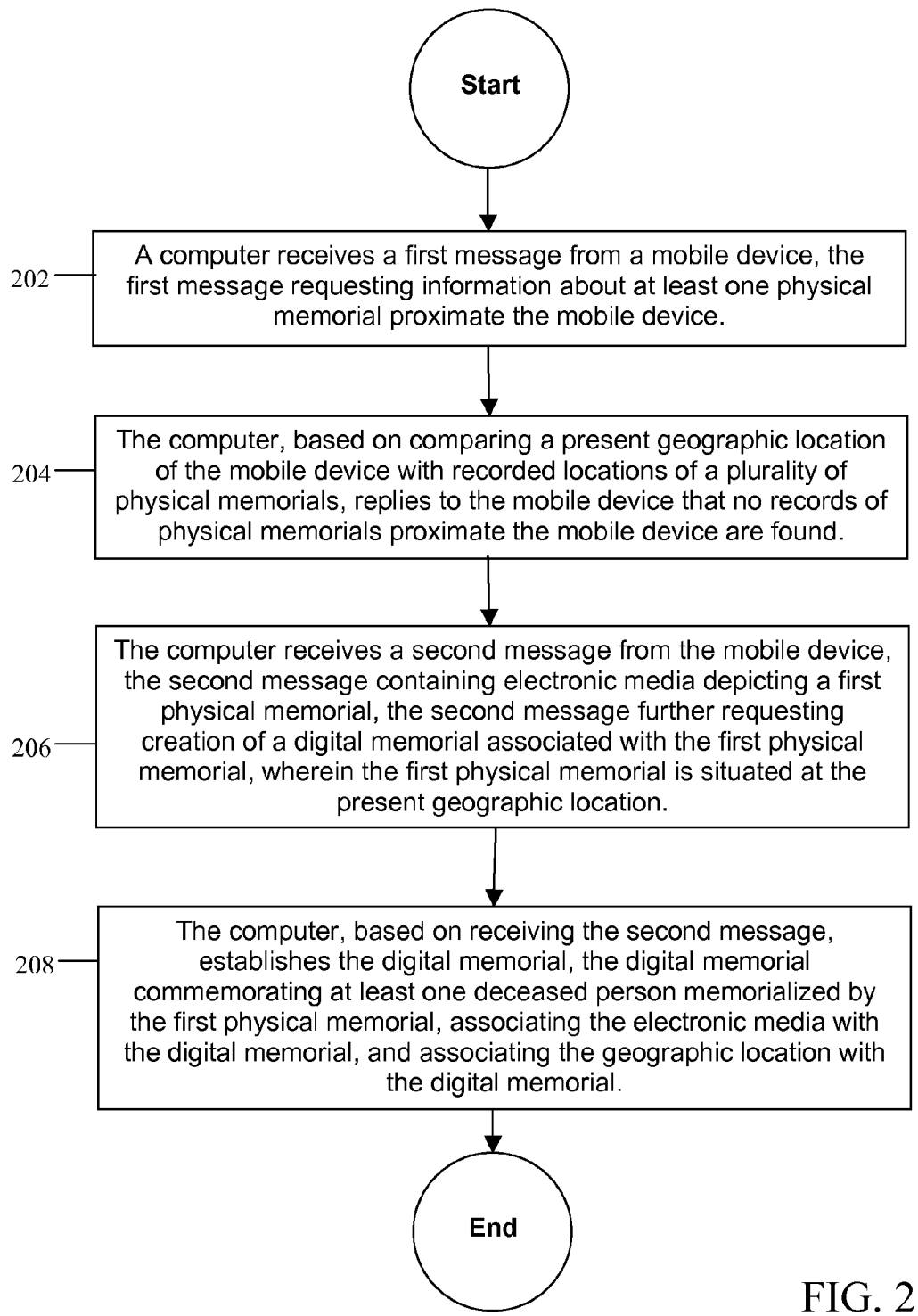
FIG. 2 is a flowchart of a method for remotely accessing and publishing online memorial content according to an embodiment of the present disclosure.

Turning to FIG. 2, a flowchart is provided depicting the steps of a method describing the second embodiment discussed above. FIG. 2 is a flowchart of a method for remotely accessing and publishing online memorial content according to the second embodiment.

Beginning at block 202, a computer receives a first message from a mobile device, the first message requesting information about at least one physical memorial proximate the mobile device. At block 204, the computer, based on comparing a present geographic location of the mobile device with recorded locations of a plurality of physical memorials, replies to the mobile device that no records of physical memorials proximate the mobile device are found.

At block 206, the computer receives a second message from the mobile device, the second message containing electronic media depicting a first physical memorial, the second message further requesting creation of a digital memorial associated with the first physical memorial, wherein the first physical memorial is situated at the present geographic location. At block 208, the computer, based on receiving the second message, establishes the digital memorial, the digital memorial commemorating at least one deceased person memorialized by the first physical memorial, associating the electronic media with the digital memorial, and associating the geographic location with the digital memorial. The method 200 terminates thereafter.

In a third embodiment, a subscriber may wish for newly created content 152, 154, 156 to be added to an existing online memorial 162 while the subscriber is visiting a gravesite or memorial. The subscriber may have a photograph taken of himself standing next to his father's gravestone wish to have the photograph included as content 152 in a previously established online memorial 162 for his father. The subscriber wants the photograph to be viewable when other family members visit the gravesite or be viewable as part of the online memorial 162 when viewed remotely. The subscriber captures such a photograph with the mobile device 130 and sends the photograph to the memorial application 120 as an attachment to a text message, as an attachment to an electronic mail message, or using another method. The subscriber may do so immediately while still at the gravesite or at a later time.

If the subscriber is sending the photograph to the memorial application 120 using the mobile device 130, the memorial application 120 will recognize the subscriber by reading the International Mobile Equipment Identifier (IMEI) or other identifier of the mobile device 130 embedded in the message or by receiving signaling from the client 132 executing on the mobile device 130. If the subscriber is sending the photograph by electronic mail, the memorial application 120 recognizes the electronic mail address used by the subscriber. The subscriber may send the photograph to the memorial application 120 for inclusion in the online memorial 162 while at the gravesite or at a later time.

As noted, online memorials 162, 164, 166 may be maintained by caregiver as private, with access restricted to designated family members and other parties. If a person unrelated to a family that maintains an online memorial 162 marked private were to request information using his or her mobile device 130 about a gravesite of the deceased person that is the subject of the family's online memorial 162, the memorial application 120 may deny the request. In an embodiment, a personalized online memorial 162 could be private and not publicly accessible but some stored content 152, 154, 156, for example publicly available photographs, about the same deceased person may not be private and instead are stored as viewable should an unrelated subscriber request it when proximate the gravesite of the deceased person. An online memorial 162 may be a private, personalized arrangement of material created by the surviving family or friends while some additional stored content 152, 154, 156 about the same deceased person may be little more than publicly available photographs of and documents or articles maintained by other persons, for example fans, in another online memorial 164 about the deceased person.

Figure 3:
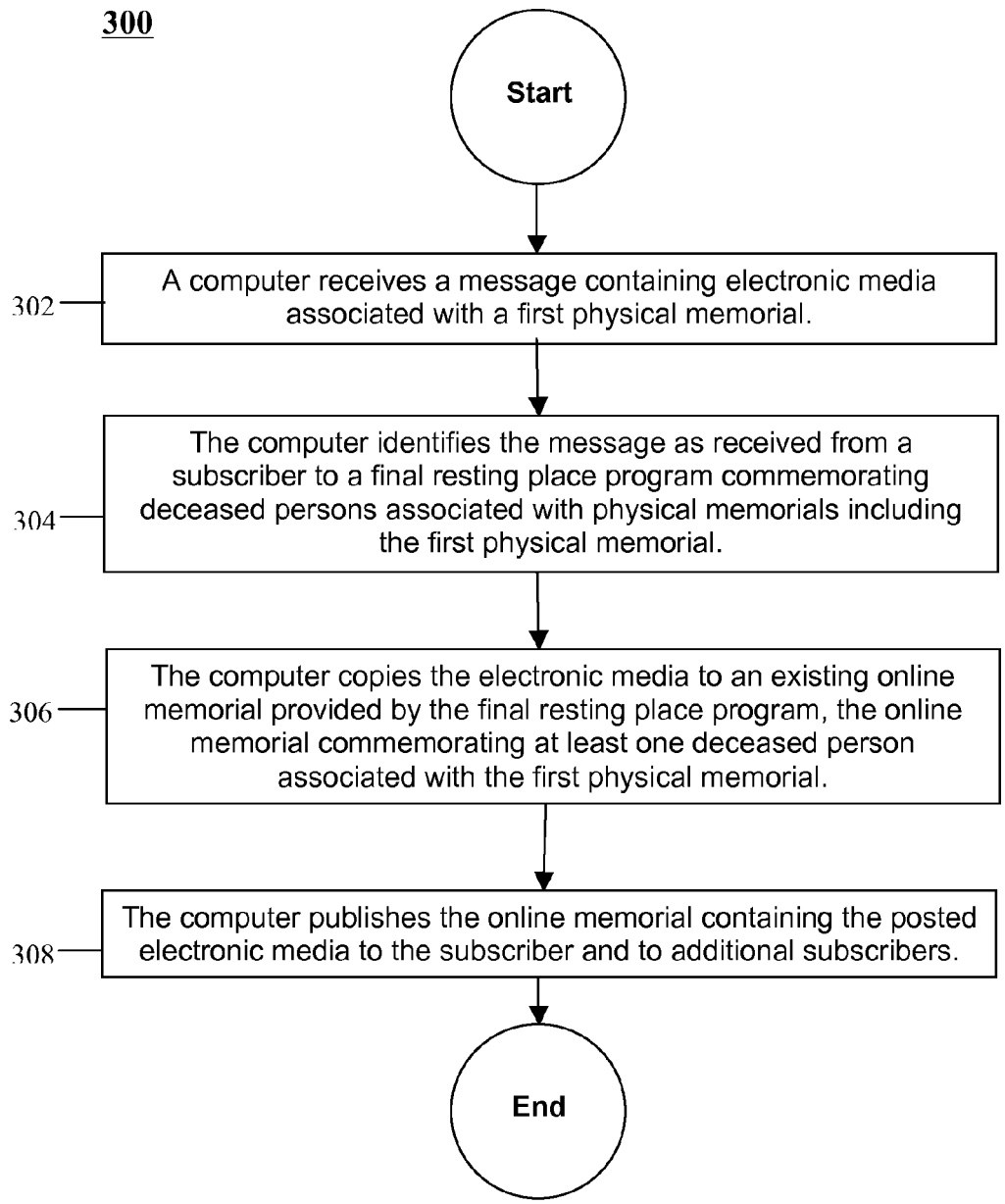
FIG. 3 is a flowchart of a method for remotely accessing and publishing online memorial content according to an embodiment of the present disclosure.

Turning to FIG. 3, a method 300 is provided that describes the third embodiment discussed above. FIG. 3 is a flowchart of a method of accessing and publishing online memorial content in accordance with an embodiment of the present disclosure. Beginning at block 302, a computer receives a message containing electronic media associated with a first physical memorial.

At block 304, the computer identifies the message as received from a subscriber to a final resting place program commemorating deceased persons associated with physical memorials including the first physical memorial. At block 306, the computer copies the electronic media to an existing online memorial provided by the final resting place program, the online memorial commemorating at least one deceased person associated with the first physical memorial. At block 308, the computer publishes the online memorial containing the posted electronic media to the subscriber and to additional subscribers. The method 300 terminates thereafter.

Online memorials 162, 164, 166 may be valuable to a family member who resides too far from a burial site of a loved one to visit the site when desired. When such a distant family member purchases flowers by telephone or Internet from a florist near the cemetery for placement at the gravesite, the family member does not have the opportunity to see the flowers in person as the flowers have been placed by the florist or memorial park personnel as requested. With an online memorial 162 created, the out-of-town family member could, for example, have an adult sibling who resides near the cemetery visit the gravesite, photograph the newly placed flowers at the site, and add the photograph taken to the online memorial 162. The out-of-town family member could then access the online memorial 162 that may be viewable after authentication via an Internet web site, view the photograph that his local sibling took and added to the online memorial 162, and enjoy the experience of seeing the flowers he purchased placed at the gravesite of his loved one.

Families and former associates may be creative in building an online memorials 162 for a friend or loved one. They may add written tributes and video clips and they may add seasonal material or items associated with the person's birthday or life's activities. An authorized friend who attended baseball games with the deceased may add a tribute to the online memorial 162 when their favorite team wins a championship long after the deceased person's passing. A large family including adult children may on the anniversary of their beloved father's passing or at a holiday time create a video, photographic, or musical tribute, for example, affectionately named "Dressing Up Our Dad" that is added to the online memorial 162 for their father. Such a tribute viewable from home might be more fun and informative for grandchildren and great-grandchildren of the deceased than a visit to the cemetery.

Online memorials 162, 164, 166 may be added to groups that may be created by subscribers accessing the memorial application 120. A group may be created, for example, to commemorate victims of a natural disaster. Caregivers with controlling authority over online memorials 162, 164, 166 for such victims may then add their particular online memorial 162 to the group. In an embodiment, some content 152, 154, 156 may be communally stored among online memorials 162, 164, 166 in the group. Further, authorized persons associated with online memorials 162, 164, 166 that are members of the group may share messages among each other. Such authorized persons may also post electronic material that may be generally viewable by most or all parties associated with the group.

The term "physical memorial" as used herein may be indicate a gravestone, a memorial object, or a mausoleum located at a cemetery, memorial park, or monument or other commemorative site where a deceased person may or may not be physically buried or otherwise at rest. Programs administered by the memorial application 120 as described herein may be referred to as "final resting place" programs.

The term "subscriber" as used herein indicates a user of the mobile device 130 upon which the client 132 is executing. The client 132 may be a downloadable application or "app" that the subscriber as user of the mobile device 130 agrees to use under conditions described by the client 132 and the memorial application 120 accessible via the client 132. The use of the term "subscriber" is not meant to imply that the subscriber as user of the mobile device 130 is subject to any periodic payment arrangement with the memorial application 120 or any other components described herein.

As noted, the memorial server 110 is a general purpose computer. The general purpose computer comprises at least a processor or central processing unit (CPU), read-only memory, random access memory, data storage, and input/output devices. The general purpose computer may also comprise network interface cards (NIC) to communicate on a local area network (LAN) and other hardware promoting communication over wide area networks and the Internet.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they converge into one or more integrated components, devices, circuits, and/or software programs.

What is claimed is:

1. A system for accessing and publishing online memorial content, comprising:
    a processor;
    a memory; and
    a memorial application stored in the memory that, when executed on the processor:
    receives a first message from a mobile device, the first message requesting information about physical memorials proximate the mobile device,
    compares a determined present physical location of the mobile device with at least a first proximate physical memorial described in a database,
    transmits to the mobile device a list including the at least first proximate physical memorial and other physical memorials within a predetermined distance of the present physical location, wherein information about the at least first proximate physical memorial and the other physical memorials is available to subscribers, wherein information about deceased person associated with one of the plurality of physical memorials is marked in the database as private,
    receives a second message from the mobile device, the second message containing a selection of the first physical memorial from the list, and
    sends to the mobile device electronic media commemorating at least one deceased person associated with the first physical memorial, electronic media associated with the physical memorial is sent only to devices designated as authorized;
    based on comparing the determined present geographic location of the mobile device with recorded locations of a plurality of physical memorials, replying to the mobile device that no records of physical memorials proximate the mobile device are found;
    receiving a third message from the mobile device, the third message containing electronic media depicting the first physical memorial, the third message further requesting creation of a digital memorial associated with the first physical memorial, wherein the first physical memorial is situated at the present geographic location;
    based on receiving the third message, establishing the digital memorial, the digital memorial commemorating at least one deceased person memorialized by the first physical memorial, associating the electronic media with the digital memorial, and associating the geographic location with the digital memorial;
    the system further comprises receiving a fourth message containing electronic media associated with a first physical memorial;
    identifying the fourth message as received from a subscriber to a final resting place program commemorating deceased persons associated with physical memorials including the first physical memorial;
    copying the electronic media to an existing online memorial provided by the final resting place program, the online memorial commemorating at least one deceased person associated with the first physical memorial; and
    the computer publishing the online memorial containing the posted electronic media to the subscriber and to additional subscribers.

2. The system of claim 1, wherein the physical memorials are at least one of gravestones marking the burial of deceased persons, mausoleums, and monuments commemorating at least one deceased person.

3. The system of claim 1, wherein the system identifies the present physical location of the mobile device by analyzing global positioning coordinates of the mobile device.

4. The system of claim 2, wherein the electronic media comprises photographs, video content, audio content, and text material associated with the at least one deceased person.

5. The system of claim 2, wherein the system accepts the electronic media from the mobile device at least one of at the time the mobile device is proximate the first physical memorial and at a subsequent time.

6. The method of claim 1, wherein the computer maintains the digital memorial as an online memorial accessible by a user of the mobile device as caregiver of the online memorial.

7. The method of claim 6, wherein the caregiver controls electronic access to the online memorial and appoints others as additional caregivers.

8. The method of claim 1, further comprising the computer accepting new electronic media and other stored electronic media to be creatively arranged and viewed as the online memorial from locations away from the first physical memorial.

9. The method of claim 1, wherein the message is one of text message and an electronic mail message.

10. The method of claim 1, wherein the message is associated with the subscriber by one of examining an International Mobile Equipment Identifier (IMEI) contained in the text transmission and verifying an electronic mail address associated with an electronic mail message.

11. The method of claim 1, wherein the subscriber and the additional subscribers are one of family members, friends, and former associates of the at least one deceased person.

12. The method of claim 1, wherein the message is received one of at the time of the subscriber's visit to the first physical memorial and subsequent to the subscriber's visit.

13. The method of claim 1, wherein in addition to submitting electronic media for inclusion in the online memorial, the subscriber is authorized to download and view electronic media marked public for selected additional physical memorials.

\* \* \* \* \*